US010096072B1

(12) United States Patent
Ali et al.

(10) Patent No.: US 10,096,072 B1
(45) Date of Patent: Oct. 9, 2018

(54) METHOD AND SYSTEM FOR REDUCING THE PRESENTATION OF LESS-RELEVANT QUESTIONS TO USERS IN AN ELECTRONIC TAX RETURN PREPARATION INTERVIEW PROCESS

(71) Applicant: Intuit Inc., Mountain View, CA (US)

(72) Inventors: Safia Ata Ali, San Francisco, CA (US); Marc Attinasi, Encinitas, CA (US); Heather Daggett, San Diego, CA (US); Phillip J. Ohme, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 899 days.

(21) Appl. No.: 14/530,188

(22) Filed: Oct. 31, 2014

(51) Int. Cl.
*G06Q 40/00* (2012.01)
(52) U.S. Cl.
CPC .................. *G06Q 40/123* (2013.12)
(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| 5,884,283 | A | 3/1999 | Manos |
| 6,021,397 | A | 2/2000 | Jones et al. |
| 6,401,080 | B1 | 6/2002 | Bigus et al. |
| 7,010,507 | B1 | 3/2006 | Anderson et al. |
| 7,181,438 | B1 | 2/2007 | Szabo |
| 7,539,635 | B1 | 5/2009 | Peak et al. |
| 7,590,572 | B2 | 9/2009 | Larson |
| 7,603,301 | B1 | 10/2009 | Regan |
| 7,610,226 | B1 | 10/2009 | Miller |
| 7,636,742 | B1 | 12/2009 | Olavarrieta et al. |
| 7,680,756 | B2 | 3/2010 | Quinn et al. |

(Continued)

FOREIGN PATENT DOCUMENTS

| JP | 2002-099613 | 4/2002 |
| KR | 10-2009-0089225 | 8/2009 |

OTHER PUBLICATIONS

Forsati, R.; "Web Page Personalization Based on Weighted Association Rules," 2009 International Conference on Electronic Computer Technology, pp. 130-135.

(Continued)

*Primary Examiner* — Frantzy Poinvil
(74) *Attorney, Agent, or Firm* — Hawley Troxell Ennis & Hawley LLP; Philip McKay

(57) ABSTRACT

A method and system include reducing a presentation of less-relevant questions to a user of a tax return preparation system to personalize a tax return preparation interview process for the user, according to one embodiment. The method and system include providing a number user experience elements to a user to select from, according to one embodiment. The method and system include receiving selected ones of the number of user experience elements from the user interface, according to one embodiment. The method and system include prioritizing questions of the tax return preparation interview process, by relevance to the user, based at least partially on the selected ones of the number of user experience elements, according to one embodiment. The method and system include delivering relevant ones of the questions to the user through the user interface to progress the user through the tax return preparation interview process, according to one embodiment.

33 Claims, 6 Drawing Sheets

(56) References Cited

U.S. PATENT DOCUMENTS

| | | |
|---|---|---|
| 7,685,034 B1 | 3/2010 | Mori et al. |
| 7,693,769 B1 | 4/2010 | Burlison et al. |
| 7,747,484 B2 | 6/2010 | Stanley et al. |
| 7,778,895 B1 | 8/2010 | Baxter et al. |
| 7,818,222 B2 | 10/2010 | Allanson et al. |
| 7,836,406 B1 | 11/2010 | Kirsten et al. |
| 7,848,971 B1 | 12/2010 | Mori et al. |
| 7,860,763 B1 | 12/2010 | Quinn et al. |
| 7,904,356 B1 | 3/2011 | Cobarrubia |
| 7,930,226 B1 | 4/2011 | Quinn et al. |
| 8,001,006 B1 | 8/2011 | Yu et al. |
| 8,019,664 B1 | 9/2011 | Tifford et al. |
| 8,024,660 B1 | 9/2011 | Quinn et al. |
| 8,190,499 B1 | 5/2012 | McVickar |
| 8,204,805 B2 * | 6/2012 | Eftekhari ............... G06F 21/31 705/19 |
| 8,346,635 B1 | 1/2013 | Olim |
| 8,407,113 B1 | 3/2013 | Eftekhari et al. |
| 8,417,596 B1 | 4/2013 | Dunbar et al. |
| 8,417,715 B1 | 4/2013 | Bruckhaus et al. |
| 8,418,920 B2 | 4/2013 | Lieberman et al. |
| 8,423,444 B1 | 4/2013 | Mackrell et al. |
| 8,429,184 B2 | 4/2013 | Ismalon |
| 8,433,627 B2 * | 4/2013 | Agee ............... G06Q 20/10 705/19 |
| 8,447,667 B1 | 5/2013 | Dinamani et al. |
| 8,452,676 B1 | 5/2013 | Talan et al. |
| 8,606,665 B1 | 12/2013 | Shaw |
| 8,635,127 B1 * | 1/2014 | Shaw ............... G06Q 20/207 705/31 |
| 8,656,273 B1 | 2/2014 | Tifford et al. |
| 8,694,397 B2 * | 4/2014 | Seubert ............... G06Q 10/10 705/35 |
| 8,719,120 B1 | 5/2014 | McVickar et al. |
| 8,812,380 B2 | 8/2014 | Murray et al. |
| 8,857,713 B2 | 10/2014 | Lieberman et al. |
| 8,874,731 B1 | 10/2014 | Puppin |
| 8,903,810 B2 | 12/2014 | Ismalon |
| 8,942,999 B1 | 1/2015 | Fernando et al. |
| 9,037,962 B1 | 5/2015 | Vassar et al. |
| 9,098,586 B1 | 8/2015 | Latif et al. |
| 9,117,247 B2 | 8/2015 | Lieberman et al. |
| 9,153,141 B1 | 10/2015 | Kane et al. |
| 9,280,252 B1 | 3/2016 | Brandmaier et al. |
| 9,286,282 B2 | 3/2016 | Ling et al. |
| 9,390,402 B1 | 7/2016 | Kane et al. |
| 9,406,089 B2 | 8/2016 | Mori et al. |
| 9,412,017 B1 | 8/2016 | Huang et al. |
| 9,444,824 B1 | 9/2016 | Balazs et al. |
| 2002/0052774 A1 | 5/2002 | Parker et al. |
| 2002/0111888 A1 | 8/2002 | Stanley et al. |
| 2004/0078271 A1 * | 4/2004 | Morano ............... G06Q 20/207 705/19 |
| 2005/0054381 A1 | 3/2005 | Lee et al. |
| 2005/0144072 A1 | 6/2005 | Perkowski et al. |
| 2005/0160103 A1 | 7/2005 | Raffo |
| 2005/0210024 A1 | 9/2005 | Hurst-Hiller et al. |
| 2005/0246234 A1 | 11/2005 | Munyon |
| 2006/0085306 A1 | 4/2006 | Schulte et al. |
| 2006/0122918 A1 | 6/2006 | Graboske et al. |
| 2006/0155632 A1 | 7/2006 | Cherkas et al. |
| 2006/0178961 A1 | 8/2006 | Stanley et al. |
| 2006/0184410 A1 | 8/2006 | Ramamurthy et al. |
| 2007/0033116 A1 | 2/2007 | Murray |
| 2008/0027979 A1 | 1/2008 | Chandrasekar et al. |
| 2008/0059900 A1 * | 3/2008 | Murray ............... G06F 3/0482 715/777 |
| 2008/0104045 A1 | 5/2008 | Cohen et al. |
| 2008/0119134 A1 | 5/2008 | Rao |
| 2008/0147494 A1 | 6/2008 | Larson |
| 2008/0189197 A1 | 8/2008 | Allanson et al. |
| 2008/0201206 A1 | 8/2008 | Pokorney et al. |
| 2008/0263643 A1 | 10/2008 | Jaiswal et al. |
| 2009/0076335 A1 | 3/2009 | Schwarzberg et al. |
| 2009/0099959 A1 | 4/2009 | Liao et al. |
| 2009/0307159 A1 | 12/2009 | Pinckney et al. |
| 2010/0010849 A1 * | 1/2010 | Hurd ............... G06Q 40/00 705/36 T |
| 2010/0017348 A1 | 1/2010 | Pinckney et al. |
| 2010/0023934 A1 | 1/2010 | Sheehan et al. |
| 2010/0262495 A1 | 10/2010 | Dumon et al. |
| 2011/0004537 A1 | 1/2011 | Allanson et al. |
| 2011/0078066 A1 | 3/2011 | Sherman et al. |
| 2011/0119264 A1 | 5/2011 | Hu et al. |
| 2011/0137776 A1 | 6/2011 | Goad et al. |
| 2011/0173116 A1 | 7/2011 | Yan et al. |
| 2011/0264569 A1 | 10/2011 | Houseworth et al. |
| 2012/0030159 A1 | 2/2012 | Pilaszy et al. |
| 2012/0030767 A1 | 2/2012 | Rippert et al. |
| 2012/0053965 A1 | 3/2012 | Hellman et al. |
| 2012/0084185 A1 | 4/2012 | Ciaramitaro et al. |
| 2012/0109792 A1 * | 5/2012 | Eftekhari ............... G06F 21/31 705/31 |
| 2012/0136764 A1 | 5/2012 | Miller et al. |
| 2012/0211561 A1 | 8/2012 | Lieberman et al. |
| 2012/0215669 A1 | 8/2012 | Lieberman et al. |
| 2012/0278179 A1 | 11/2012 | Ray et al. |
| 2012/0303495 A1 | 11/2012 | Murray |
| 2012/0324393 A1 | 12/2012 | Mbenkum et al. |
| 2013/0080302 A1 * | 3/2013 | Allanson ............... G06Q 40/02 705/31 |
| 2013/0091050 A1 | 4/2013 | Merrill et al. |
| 2013/0124644 A1 | 5/2013 | Hunt et al. |
| 2013/0198047 A1 | 8/2013 | Houseworth et al. |
| 2013/0254151 A1 | 9/2013 | Mohagheghi et al. |
| 2013/0282733 A1 | 10/2013 | Tawakol et al. |
| 2014/0027509 A1 | 1/2014 | Lieberman et al. |
| 2014/0101571 A1 | 4/2014 | Lewis |
| 2014/0156566 A1 | 6/2014 | Kabiljo et al. |
| 2014/0172656 A1 | 6/2014 | Shaw |
| 2014/0180883 A1 | 6/2014 | Regan |
| 2014/0201045 A1 | 7/2014 | Pai et al. |
| 2014/0214636 A1 | 7/2014 | Rajsky |
| 2014/0222702 A1 | 8/2014 | Jennings |
| 2014/0244455 A1 | 8/2014 | Huang et al. |
| 2014/0244456 A1 * | 8/2014 | Huang ............... G06Q 40/123 705/31 |
| 2014/0279190 A1 | 9/2014 | Severinghaus et al. |
| 2014/0314225 A1 | 10/2014 | Riahi et al. |
| 2014/0324648 A1 * | 10/2014 | Mori ............... G06Q 40/123 705/31 |
| 2014/0325664 A1 | 10/2014 | Nekhoroshev |
| 2014/0337189 A1 | 11/2014 | Barsade et al. |
| 2014/0337753 A1 | 11/2014 | McKellar et al. |
| 2015/0007065 A1 | 1/2015 | Krishnamoorthy et al. |
| 2015/0026146 A1 | 1/2015 | Mance |
| 2015/0149877 A1 | 5/2015 | Ling et al. |
| 2015/0178371 A1 | 6/2015 | Seth et al. |
| 2015/0332167 A1 | 11/2015 | Kaushal et al. |
| 2015/0363875 A1 | 12/2015 | Guerry |
| 2016/0034853 A1 | 2/2016 | Wang et al. |
| 2016/0078567 A1 | 3/2016 | Goldman et al. |
| 2016/0098804 A1 | 4/2016 | Mascaro et al. |
| 2016/0125552 A1 | 5/2016 | Pathak et al. |
| 2016/0148322 A1 | 5/2016 | Mascaro et al. |
| 2016/0180470 A1 | 6/2016 | Mascaro et al. |
| 2016/0217533 A1 | 7/2016 | Laaser |
| 2016/0217534 A1 | 7/2016 | Goldman et al. |
| 2016/0246762 A1 | 8/2016 | Eaton |
| 2016/0247239 A1 | 8/2016 | Houseworth et al. |
| 2016/0275627 A1 | 9/2016 | Wang et al. |
| 2016/0328804 A1 | 11/2016 | Mori et al. |
| 2016/0328805 A1 | 11/2016 | Mori et al. |
| 2016/0328806 A1 | 11/2016 | Mori et al. |
| 2017/0004585 A1 | 1/2017 | Dang et al. |
| 2017/0132314 A1 | 5/2017 | Liu et al. |

OTHER PUBLICATIONS

Anders, B. Susan; "Website of the Month: MSN Money Tax Center," Apr. 2013, The CPA Journal, pp. 72-73.

(56) References Cited

OTHER PUBLICATIONS

Publication 559: Final Income Tax Return for Decedent—Form 1040, p. 2, paragraph 2; https://taxmap.ntis.gov/taxmap/pub/p559-001.htm; retrieved from the Internet Jul. 11, 2017.
U.S. Appl. No. 60/608,035, filed Sep. 7, 2004, Quinn et al.
"Modular Programming," Wikipedia, the free encyclopedia, Jul. 29, 2014, http://en.wikipedia.org/w/index.php?title=Modular_programming&oldid=618953117, retrieved from the Internet on Mar. 31, 2015, 4 pages.
Laaser et al., "Method and System for Applying Predictive Models to Reduce Task Abandonment by a User," U.S. Appl. No. 14/529,317, filed Oct. 31, 2014.
Laaser et al., "Identification of Electronic Tax Return Errors Based on Declarative Constraints," U.S. Appl. No. 14/530,305, filed Oct. 31, 2014.
Goldman et al., "Predictive Model Based Identification of Potential Errors in Electronic Tax Return," U.S. Appl. No. 14/530,369, filed Oct. 31, 2014.
Laaser et al., "Method and System for Identifying Product Defects Within a Tax Return Preparation System," U.S. Appl. No. 14/607,935, filed Jan. 28, 2015.
Laaser et al., "Method and System for Assisting Tax Return Preparers with the Preparation of Tax Returns for Client Tax Filers," U.S. Appl. No. 14/634,219, filed Feb. 27, 2015.
Cabrera et al., "Method and System for Providing a Personalized Recommendation for a Tax Return Preparer," U.S. Appl. No. 14/670,986, filed Mar. 27, 2015.
Laaser et al., "Methods, Systems and Computer Program Products for Calculating an Estimated Result of a Tax Return," U.S. Appl. No. 14/674,582, filed Mar. 31, 2015.
Laaser et al., "Systems for Identifying Abandonment Indicators for an Electronic Tax Return Preparation Program," U.S. Appl. No. 14/698,645, filed Apr. 28, 2015.

\* cited by examiner

METHOD AND SYSTEM FOR REDUCING THE PRESENTATION OF LESS-RELEVANT QUESTIONS TO USERS IN AN ELECTRONIC TAX RETURN PREPARATION INTERVIEW PROCESS

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics used to generate a sequence of interview questions are static features that are typically hard-coded elements of the tax return preparation system and do not lend themselves to effective or efficient modification. As an example, in traditional tax return preparation systems, the sequence of questions presented to a user is pre-determined based on a generic user model that is, in fact and by design, not accurately representative of any particular "real world" user. Consequently, irrelevant, and often confusing, interview questions are virtually always presented to any given real world user. It is therefore not surprising that many, if not all, user of these traditional tax return preparation systems experience, at best, an impersonal, unnecessarily long, confusing, and complicated, interview process and user experience. Clearly, this is not the type of impression that results in happy, loyal, repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. Clearly, this is an undesirable result for both the potential user of the tax return preparation system and the provider of the tax return preparation system.

What is needed is a method and system for reducing the presentation of irrelevant questions to users during a tax return preparation interview, to improve the personalization of the electronic tax return preparation interview process.

SUMMARY

Embodiments of the present disclosure address the shortcomings of traditional tax return preparation systems with systems and methods that reduce the presentation of less-relevant and/or irrelevant questions to users during the tax return preparation interview, to improve the personalization of the electronic tax return preparation interview process, according to one embodiment. The systems and methods include providing a user with user experience elements, e.g., the graphical icons, that represent tax-related topics and/or characteristics of the user's life, according to one embodiment. For example, some of the user experience elements represent whether the user is a homeowner, whether the user is single, whether the user has children, whether the user is unemployed, whether the user is a contractor, whether the user has donated money to charity, whether the user has medical expenses, and the like. Each of the user experience elements is associated with and/or related to one or more tax return preparation interview questions, which may be stored in a question database, a question table, or some other data structure within the service provider computing environment, according to one embodiment. The user chooses which user experience elements are relevant to the user, by dragging and dropping the user experience elements from the first region in a user interface to a second region in the user interface, according to one embodiment. The tax return preparation system then uses the selected ones of the user experience elements to prioritize the questions of the question database to filter out any less-relevant or irrelevant questions, according to one embodiment. The tax return preparation system then presents the relevant questions from the question database to the user based on the user experience elements that were initially selected by the user, to progress the user through the tax return preparation interview process using personalized and relevant questions, according to one embodiment.

The disclosed systems and methods address some of the shortcomings associated with traditional tax return preparation systems by increasing a relevance of questions presented to a user in an electronic tax return preparation interview process based on graphical user experience elements selected by the user, according to one embodiment. As a result, embodiments of the present disclosure improve the technical fields of user experience, electronic tax return preparation, and data flow and distribution by enabling a tax return preparation system to gather more complete information from the user and to provide a more thorough and customized analysis of potential tax return benefits for the user.

In addition, by minimizing, or potentially eliminating, the processing and presentation of irrelevant questions, implementation of embodiments of the present disclosure allows for significant improvement to the field of data collection and data processing. As one illustrative example, by minimizing, or potentially eliminating, the processing and presentation of irrelevant question data to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

Figure 1:
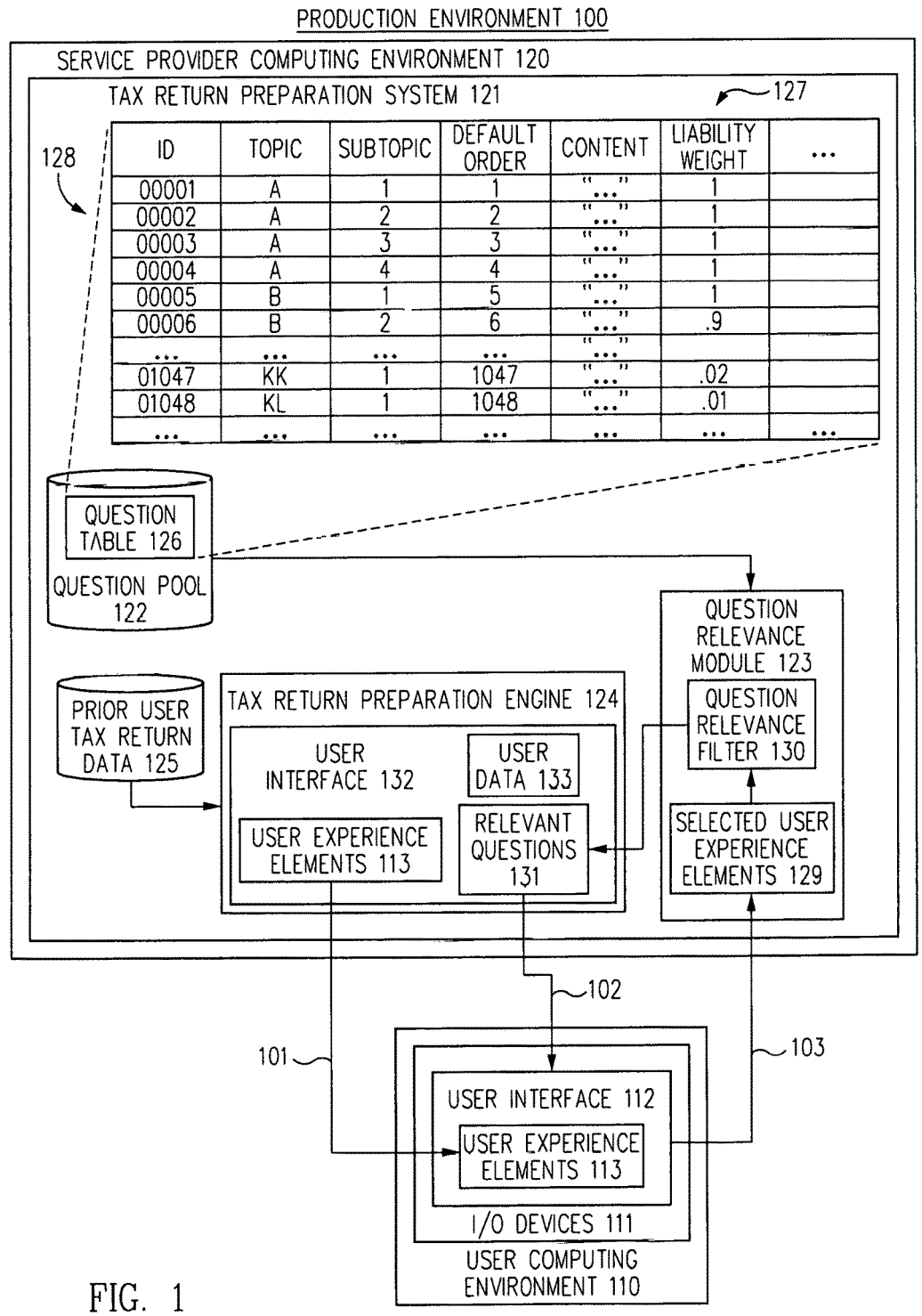
FIG. 1 is a block diagram of software architecture of a tax return preparation system for reducing the presentation of irrelevant questions to users during a tax return preparation interview, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, PROCESS, and USER EXPERIENCE sections herein describe systems and processes suitable for increasing a relevance of questions presented to a user in an electronic tax return preparation interview process to improve the personalization of the electronic tax return preparation interview process, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement either the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer (SSL) communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "user experience" includes not only the interview process, interview process questioning, and interview process questioning sequence, but also other user experience features provided or displayed to the user such as, but not limited to, interfaces, images, highlighting mechanisms, icons, progress indication tools, and any other features that individually, or in combination, create a user experience, as discussed herein, and/or as known in the art at the time of filing, and/or as developed after the time of filing.

Hardware Architecture

FIG. 1 illustrates a block diagram of a production environment 100 for increasing a relevance of questions presented to a user in an electronic tax return preparation interview process, according to one embodiment. The production environment 100 is configured to provide relevant questions to a user during an electronic tax return preparation interview by filtering less relevant questions from a question pool, at least partially based on a manipulation or selection of user experience elements by the user, according to one embodiment. The production environment 100 increases the relevance of questions presented to the user in the electronic tax return preparation interview process by presenting a number of user experience elements for the user to select from, receiving the selected user experience elements from the user, generating a relevance filter based on the selected user experience elements, applying the relevance filter to questions in a question pool to determine relevant questions for the user, and presenting the relevant questions to the user to progress the user through an electronic tax return preparation interview, according to one embodiment. The user experience elements include icons and/or text that identify tax-related topics or tax-related subtopics, according to one embodiment. The user experience elements are presented to the user, can be relocated within a user interface by the user, and are representative of the user's social and/or financial characteristics, according to one embodiment. Examples of characteristics that are represented by user experience elements include, but are not limited to, whether the user has a job, is unemployed, is a homeowner, has children, has medical bills, is single, is a business owner, is a student, has made charitable donations, has a car, is a contractor, and the like, according to various embodiments. By gamefying (or "gamifying") the initial characteristics of the user, the tax return preparation interview is simplified, is able to quickly acquire detailed information about the user, is entertaining, and is able to increase the relevance to the user of subsequently presented questions, according to one embodiment. For example, if the user selects a user experience element that indicates that the user is single, the tax return preparation interview can skip questions related to the user's spouse, according to one embodiment. As another example, if the user selects the user experience element indicates that the user is unemployed, the tax return preparation interview can reduce the relevance or priority of questions that are related to investment income, so that the questions are presented after more relevant questions are presented, according to one embodiment.

As discussed above, there are various long standing shortcomings associated with traditional tax return preparation systems. Because traditional programs incorporate hard-coded analytics algorithms and fixed sequences of questions and user interfaces, traditional tax return preparation systems provide a user experience that is impersonal and that has historically been a source of confusion and frustration to a user. Using traditional tax return preparation systems, users who are confused and frustrated by irrelevant questioning, and other generic user experience features, often attempt to terminate the interview process as quickly as possible, and/or provide, unwittingly, incorrect or incomplete data.

The production environment 100 addresses some of the shortcomings associated with traditional tax return preparation systems by increasing a relevance of questions presented to a user in an electronic tax return preparation interview process based on graphical user experience elements selected by the user, according to one embodiment. As a result, embodiments of the present disclosure improve the technical fields of user experience, electronic tax return preparation, and data flow and distribution by enabling a tax return preparation system to gather more complete information from the user and to provide a more thorough and customized analysis of potential tax return benefits for the user.

In addition, by minimizing, or potentially eliminating, the processing and presentation of irrelevant questions, implementation of embodiments of the present disclosure allows for significant improvement to the field of data collection and data processing. As one illustrative example, by minimizing, or potentially eliminating, the processing and presentation of irrelevant question data to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

The production environment 100 includes a user computing environment 110 and a service provider computing environment 120 for increasing question relevance in an electronic tax return preparation process, according to one embodiment. According to one embodiment, the production environment 100 is configured to provide relevant questions to a user during an electronic tax return preparation interview by filtering less relevant questions from a question pool, at least partially based on a manipulation or selection of user experience elements by the user. The computing environments 110 and 120 are communicatively coupled to each other with a communication channel 101, a communication channel 102, and a communication channel 103, according to one embodiment.

The user computing environment 110 represents one or more computing systems such as, but not limited to, a tablet computing device, a smart phone, a personal digital assistant, a laptop, a desktop, a netbook, a virtual machine, or other computing system capable of hosting a user interface for interaction by user, according to one embodiment. The user computing environment 110 includes input/output ("I/O") devices 111 for displaying information through a user interface 112 and for receiving information from the user through the user interface 112, according to one embodiment. The user interface 112 is executed on the user computing environment 110, but the user interface 112 is hosted by the service provider computing environment 120, according to one embodiment. In other words, in one embodiment, the user interface 112 is a remote terminal for relaying information to the user from the service provider computing environment 120, e.g., by transmission over the Internet. The I/O devices 111 include, but are not limited to, a touch sensitive screen, a microphone, a speaker, a mouse, a virtual and/or physical keyboard, a monitor, and a touchpad, according to one embodiment.

The user computing environment 110 receives user experience elements on 13 from the service provider computing environment 120, and displays the user experience elements 113 to the user through the user interface 112, for manipulation and/or selection by the user, according to one embodiment. The user experience elements 113 include icons and/or text that identify tax-related topics, tax-related subtopics, social characteristics of the user, and/or financial characteristics of the user, according to one embodiment. Examples of tax-related topics, tax-related subtopics and/or characteristics that are represented by user experience elements include, but are not limited to, whether the user has a job, is unemployed, is a homeowner, has children, has dependents, does not have children, does not have dependents, has medical bills, is single, is a business owner, is a student, has made charitable donations, has a car, is a contractor, and the like, according to various embodiments. According to various embodiments, the user experience elements 113 can have gamefied characteristics and can be shaped into tiles, bubbles, or any one of various shapes with various colors to create an entertainment-oriented atmosphere for the user as the user begin the tax return preparation interview.

The user experience elements 113 are presented to the user by the user interface 112 to enable the user to select one or more of the user experience elements 113 that are applicable to the social and/or financial characteristics of the user, according to one embodiment. Through the user interface 112, the user and determines which of the user experience elements 113 are applicable to the user, and relocates the applicable user experience elements 113 from a non-user-selected region of the user interface 112 to a user-selected region of the user interface 112, according to one embodiment. In one embodiment, a non-user-selected region of the user interface 112 is a top-half or top-portion of the user interface 112 and a user-selected region of the user interface 112 is a bottom-half, bottom-portion, or other designated portion of the user interface 112. In one embodiment, the user drags the user experience elements 113 towards an avatar or character that is representative of the user, in order to select the user experience elements 113 that are relevant to the user. In one embodiment, the user drags the user experience elements 113 into a bubble, into a well, into a box, into a house, or into another object, in order to select the user experience elements 113 that are relevant to the user. The user interface 112 is configured to enable the user to highlight, select, or otherwise indicate which of the user experience elements 113 are relevant to the user, according to various embodiments. Various embodiments of the user experience elements 113 and the user interface 112 are described below and are illustrated in FIGS. 3-6. According to various implementations, different embodiments can be released to be operated by different platforms. For example, a drag-and-drop bubble embodiment of the user experience elements 113 can be released for touch-screen devices such as tablet computing devices and smart phones, while drag-and-drop tile (round or square) embodiment of the user experience elements 113 can be released for laptop and desktop computing devices, according to one embodiment.

By gamefying the initial characteristics of the user, the tax return preparation interview is simplified, is able to quickly acquire detailed information about the user, is entertaining, and is able to decrease the amount of time consumed in progressing a user through the tax return preparation interview process by reducing and/or eliminating less-relevant and irrelevant tax return preparation questions, according to one embodiment.

The service provider computing environment 120 represents one or more computing systems such as, but not limited to, a server, a computing cabinet, and/or distribution center that is configured to receive, execute, and host one or more tax return preparation applications for access by one or more users, e.g., clients of the service provider, according to one embodiment. The service provider computing environment 120 includes a tax return preparation system 121 that is configured to provide relevant questions to a user during an electronic tax return preparation interview by filtering less relevant questions from a question pool, at least partially based on a manipulation or selection of user experience elements 113 by the user, according to one embodiment. The tax return preparation system 121 includes various components, databases, engines, modules, and data to support providing relevant questions to a user during an electronic tax return preparation interview by filtering less relevant questions from a question pool, according to one embodiment. The tax return preparation system 121 includes a question pool 122, a question relevancy module 123, a tax return preparation engine 124, and prior user tax return data 125, according to one embodiment.

The tax return preparation system 121 uses the question pool 122 to store, prioritize, and provide tax return preparation interview questions to the user in an organized manner, according to one embodiment. The question pool 122 includes a question table 126, which is a data structure for storing, organizing, and/or conveniently referencing or retrieving tax return preparation interview questions, according to one embodiment. The question table 126 includes columns 127 and rows 128 for organizing the tax return preparation interview questions, according to one embodiment. Each of the rows 128 represents a single question, and each question includes the various attributes, as indicated by the columns 127, according to one embodiment. According to various embodiments, the attributes of each question can be characterized by one or more columns 127 which include, but are not limited to, an identification ("ID"), a topic, a subtopic, a default order, content, liability weight, and the like. The ID can be a unique identifier for a question out of all of the questions included in the question pool 122, according to one embodiment. The topics, e.g., A-KL, can include, but is not limited to high-level topics such as home, self and family, charitable contributions, education, medical, and the like. The subtopics can correspond to subcategories of the topics and include, but are not limited to, mortgage interest credit, homebuyer credit, elderly/disabled credit, legal fees, student loan interest, scholarships, state and local tax refunds, and/or any other form of tax return preparation question or data acquisition, as discussed herein, and/or as known in the art at the time of filing, and/or as developed after the time of filing, according to various embodiments. The default order can be different than the ID and indicates a default priority of presentation of each question, according to one embodiment. The content includes the actual question presented to the user, according to one embodiment. The liability weight is an indication of how important the question is to present to the user to protect the tax return preparation service provider from liability to the user for improper tax return preparation, according to one embodiment. The liability weight can range from 1, e.g., the question must be presented to the user in one form or another, to 0, e.g., the question may be withheld from the user without subjecting the tax return preparation service provider to liability to the user, according to one embodiment. The attributes of each question can be used by the tax return preparation system 121 to prioritize, filter, or otherwise determine relevancy of each question 2 user, according to one embodiment.

The question relevance module 123 determines the relevancy of the questions of the question pool 122 based on the user experience elements 113 that are selected by the user, according to one embodiment. In one embodiment, the question relevance module 123 is included in the tax return preparation engine 124. In another embodiment, the question relevance module 123 is within the tax return preparation system 121 that is separate from the tax return preparation engine 124. The question relevance module 123 receives selected user experience elements 129 from the user interface 112, according to one embodiment. The question relevance module 123 can receive the selected user experience elements 139 from the user interface 112 through the tax return preparation engine 124, according to one embodiment. In another embodiment, the question relevance module 123 receives the selected user experience elements 139 directly from the user interface 112 via communications channel 103.

Using the selected user experience elements 129, the question relevance module 123 is configured to generate a question relevance filter 130, according to one embodiment. The question relevance filter 130 is based on the personal, social, and/or financial characteristics of the user that the user has identified as relevant, according to one embodiment. The question relevance filter 130 filters tax return preparation interview questions from the question pool 122 based on the topics of the questions, according to one embodiment. The question relevance filter 130 filters tax return preparation interview questions from the question pool 122 based on the topics and/or the subtopics of the questions, according to another embodiment. In one embodiment, the question relevance filter 130 prioritizes the tax return preparation interview questions of the question pool 122 based on the selected experience elements 129. For example, if the selected user experience elements 129 include user experience elements that identify the user as single, having no children, and having no dependence, then the question relevance filter 130 will assign a low priority to questions associated with a topic or subtopic of children/other dependence. When the question relevance filter 130 assigned a low priority to tax return preparation interview questions, the tax return preparation engine 124 can be configured to omit providing the less-relevant questions to the user, or can be configured to delay or deemphasize the presentation of the less-relevant questions to the user, according to one embodiment.

The question relevance module 123 receives tax return preparation interview questions from the question pool 122, applies the question relevance filter 130 to the received questions, and provides relevant questions 131 to the tax return preparation engine 124, for presentation to the user through the user interface 112, according to one embodiment. The question relevance module 123 generates the relevant questions 131 in the question pool 122 or in another data structure, from which the tax return preparation engine 124 retrieves the relevant questions 131 when the tax return preparation engine 124 is ready to transmit the relevant questions 131 to the user through the user interface 112, according to one embodiment. The question relevance module 123 applies the question relevance filter 130 to the questions of the question pool 122 by changing the default order or a prioritization of the questions in the question pool 122, according to one embodiment. Because the questions of the question pool 122 may be referenced and/or used for many users of the tax return preparation system 121, it may be impractical to reorder the questions of the question pool 122 for a single user, according to one embodiment. Accordingly, the relevant questions 131 may include references to the questions of the question pool 122, which are prioritized in accordance with the selected user experience elements 129 and the question relevance filter 130, according to one embodiment.

The tax return preparation engine 124 guides the user through the tax return preparation process by presenting the user with tax return preparation interview questions from the question pool 122, according to one embodiment. The tax return preparation engine 124 includes a user interface 132 to receive user data 133 from the user and to present relevant questions 131 to the user, according to one embodiment. The user interface 132 includes one or more user experience elements 113 and user interface tools, such as, but not limited to, user-selectable tiles, buttons, icons, images, dialog boxes, text boxes, check boxes, radio buttons, slides, directory trees, drop-down menus, and knobs for communicating information to the user and for receiving the user data 133 from the user, according to one embodiment. The tax return preparation engine 124 employs the user interface 132 to receive the user data 133 from the I/O devices 111 of the user computing environment 110 and employs the user interface 132 to transmit the user experience elements 113 followed by the relevant questions 131 to the I/O devices 111 of the user computing environment 110, according to one embodiment.

In some embodiments, the tax return preparation system 121 is configured to use the tax return preparation engine 124 to recommend additional user experience elements 113, e.g., tiles or bubbles, to the user based on the user experience elements 113 that the user has selected, i.e., based on the selected user experience elements 129. The tax return preparation system 121 is configured to recommend additional user experience elements 113 based on user experience elements 113 that have been relevant to other users having selected user experience elements 129 in common with the user of the user computing environment 110, according to one embodiment.

The user data 133 can include, but is not limited to, a user's name, a Social Security number, government identification, a driver's license number, a date of birth, an address, a zip code, a home ownership status, a marital status, an annual income, a job title, an employer's address, spousal information, children's information, assets, medical history, and the like, according to various embodiments. In some implementations, the user data 133 is a subset of all of the user information used by the tax return preparation system 121 to prepare the user's tax return, e.g., is limited to marital status, children's information, and annual income. The user data 133 can also include, but is not limited to, any information that the tax return preparation system 121 stores or can import from the prior user tax return data 125, according to one embodiment. The tax return preparation engine 124 is configured to acquire the user data 133 by progressing the user through the tax return preparation interview and is configured to prepare a tax return for the user based on the user data 133, according to one embodiment.

According to various embodiments, the user experience elements 113 can be used to provide additional information to the user can be used to receive additional information from the user. For example, the user experience elements 113 or the selected user experience elements 129 are used as navigation buttons during the tax return preparation interview, according to one embodiment. Once the user has identified particular user experience elements 113 as being relevant to the user, the tax return preparation engine 124, the user interface 132, and/or the user interface 112 is configured to display the selected user experience elements 129, e.g., along a side or along the top of the user interface 112, to enable the user to navigate between pages by clicking on the displayed selected user experience elements 129, according to one embodiment. For example, if one selected user experience elements 129 represents medical expenses, the user can click on the medical expenses user experience element to navigate to a questionnaire page that includes questions related to medical expenses for the user, according to one embodiment.

As another example, the user experience elements 113 or the selected user experience elements 129 are used to indicate progress through the tax return preparation interview, according to one embodiment. Once the user has identified particular user experience elements 113 as being relevant the user, the tax return preparation engine 124, the user interface 132, and/or the user interface 112 is configured to display the selected user experience elements 129, e.g., along a side or along the top of the user interface 112, to indicate to the user which tax topics the user has completed and which tax topics the user has yet to complete, according to one embodiment. For example, the tax return preparation system 121 can be configured to highlight selected user experience elements 129 that are associated with questions for a tax topic that have been completed by the user, highlight selected user experience elements 129 that are associated with questions for a tax topic that have not been completed, and/or otherwise mark/identify selected user experience elements 129 that are associated with questions for a tax topic that have been completed or that have not been completed by the user, according to various embodiments. Accordingly, the tax return preparation system 121 can be configured to provide an easily understood progress bar using user experience elements 113 that have been selected by the user as being relevant to the user, according to one embodiment.

As yet another example, the user experience elements 113 or the selected user experience elements 129 can be configured to enable a user to identify relationships between the user and dependence of the user, according to one embodiment. For example, the user experience elements 113 or the selected user experience elements 129 can be provided by the tax return preparation system 121 to the user to enable the user to drag-and-drop the user experience elements 113 into, for example, a family tree or other lineage-related diagram, to enable the user to quickly and easily provide relationship information between the user and the one or more dependence of the user, according to one embodiment. If, for example, a user has a grandparent, a child, and a grandchild that are all dependents of the user, it may be far simpler for the user to identify the relationships between the user and the dependence of the user by simply dragging an icon of a male or an icon of a female into branches or roots of a family tree or other lineage-related diagram, to provide relationship information for the user to the tax return preparation system 121, according to one embodiment.

Unlike traditional tax return preparation systems, the tax return preparation system 121 can reduce confusion, frustration, and trust issues of users by prioritizing the sequence of questions presented to the user so that more relevant questions are provided to the user and irrelevant questions are presented to the user in an optional, i.e., capable of being skipped, format, according to one embodiment. As a result, the features and techniques described herein are, in many ways, superior to the service received from a tax return specialist/preparer. For example, human error associated with a tax return specialist is eliminated, the hours of availability of the tax return specialist become irrelevant, the daily number of customers is not limited by the number of people a tax return specialist is able to visit within a daily basis, and the computerized tax return preparation process is unaffected by emotion, fatigue, stress, or other external factors that may be inherent in a tax return specialist during tax return season.

The various embodiments of the disclosure can be implemented to improve the technical fields of user experience, automated tax return preparation, data collection, and data processing. Therefore, the various described embodiments of the disclosure and their associated benefits amount to significantly more than an abstract idea. In particular, by individualizing or personalizing the tax return preparation interview, a tax return preparation application may be able to gather more complete information from the user and may be able to provide a more thorough and customized analysis of potential tax return benefits for the user, according to one embodiment.

In addition, by minimizing, or potentially eliminating, the processing and presentation of irrelevant questions, implementation of embodiments of the present disclosure allows for significant improvement to the field of data collection and data processing. As one illustrative example, by minimizing, or potentially eliminating, the processing and presentation of irrelevant question data to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

Process

Figure 2:
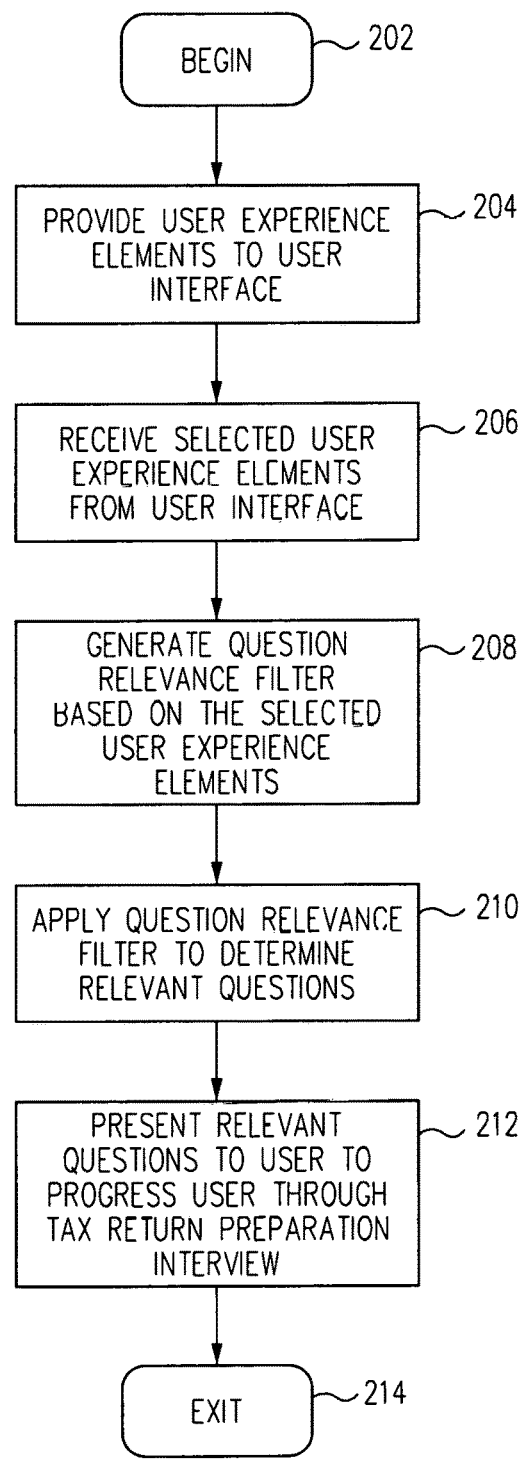
FIG. 2 is a block diagram of a process for reducing the presentation of irrelevant questions to users during a tax return preparation interview, in accordance with one embodiment.

FIG. 2 illustrates a functional flow diagram of a process 200 for increasing a relevance of questions presented to a user in an electronic tax return preparation interview process, by providing relevant questions to a user during an electronic tax return preparation interview through filtering less relevant questions from a question pool, at least partially based on a manipulation or selection of user experience elements by the user, according to one embodiment.

At block 202, the process begins.

At block 204, the process provides user experience elements to a user interface, according to one embodiment. The user experience elements can include, but are not limited to, icons, tiles, bubbles, or other shapes and/or text that describes or is associated with a tax-related topic or a group of questions for a tax-related topic, according to one embodiment.

At block 206, the process receives selected user experience elements from the user interface, according to one embodiment. In the user interface, the user selects, drags and drops, highlights, or otherwise indicates which of the user experience elements are relevant to the user, according to one embodiment. The user interface gamefies the user experience elements to simplify and increase the enjoyability of personalizing the tax return preparation interview for the user, according to one embodiment.

At block 208, the process generates a question relevance filter based on the selected user experience elements, according to one embodiment. The question relevance filter removes or de-prioritizes tax return preparation interview questions so that questions that are less-relevant to the user are either omitted from the tax return preparation interview or are presented to the user after more-relevant questions are presented to the user, according to one embodiment.

At block 210, the process applies the question relevance filter to determine relevant questions, according to one embodiment. The process can apply questions from a question pool where the question bank to the question relevance filter to determine, generate, or otherwise set apart a subset of the question pool that is more relevant to the user than the entire question pool, according to one embodiment.

At block 212, the process presents the relevant questions to the user to progress the user through the tax return preparation interview, according to one embodiment. By omitting, removing, or delaying the presentation of less-relevant questions to the user, the tax return preparation system potentially decreases the duration of the tax return preparation interview, potentially decreases the confusion of the user that is progressing through the tax return preparation interview, and potentially increases overall customer satisfaction for users of the tax return preparation system, according to one embodiment.

At block 214, the process ends.

Although a particular sequence is described herein for the execution of the process 200, other sequences can also be implemented, according to other embodiments.

User Experience

FIGS. 3-6 illustrate examples of the user interface 112 and the user experience elements 113 of the production environment 100 (shown in FIG. 1), according to various embodiments.

Figure 3:
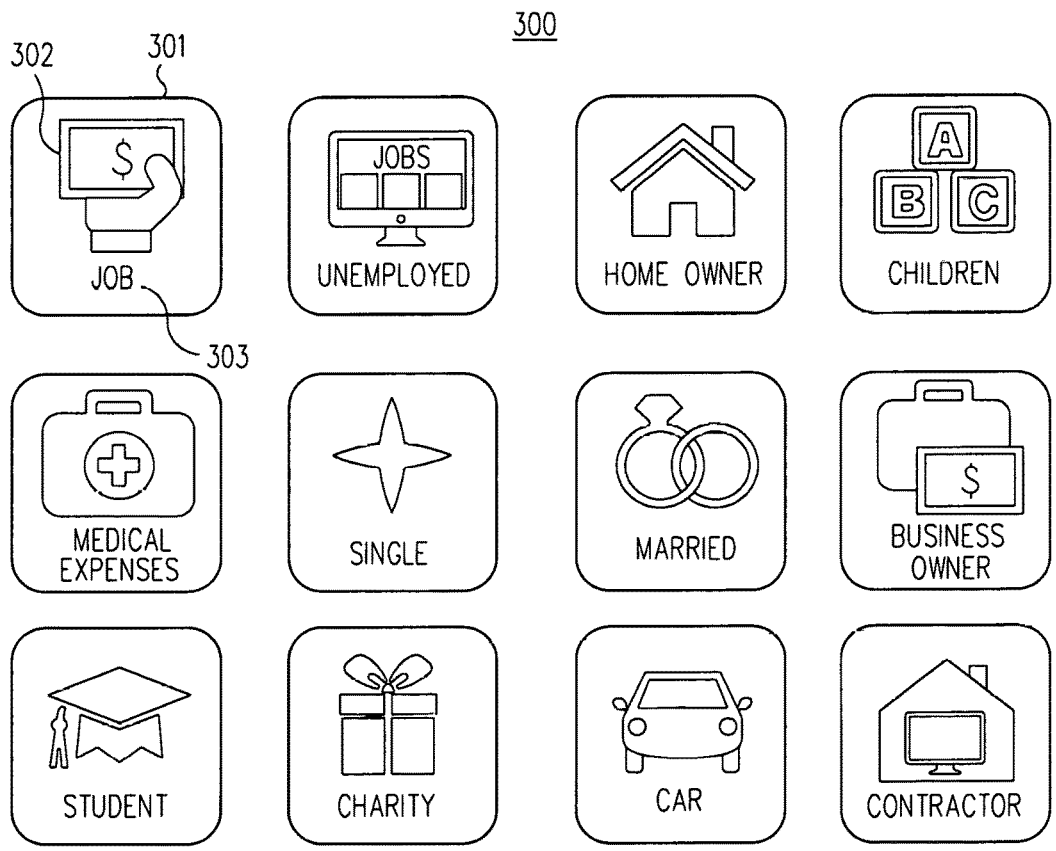
FIG. 3 is a diagram of a user interface for graphically determining tax-related topics that may be relevant to the user, in accordance with one embodiment.

FIG. 3 illustrates a user interface 300 for enabling a user to graphically determine tax-related topics that may be relevant to the user, based on a graphical selection of situations, social characteristics, and/or financial characteristics of the user, according to one embodiment. The user interface 300 includes a number of tiles 301, which are example embodiments of the user experience elements 113 of the production environment 100, according to one embodiment. Each of the number of tiles 301 includes an icon 302 and/or a text description 303, according to one embodiment. The user interface 300 includes a pallet 304, e.g., a drag-and-drop region, for receiving one or more of the number of tiles 301 that are relevant to the user's circumstances, according to one embodiment. The user interface 300 advantage is the includes icons size to facilitate manipulation with a touchscreen, such as is found in a tablet computing device and/or a smart phone, according to one embodiment.

Figure 4:
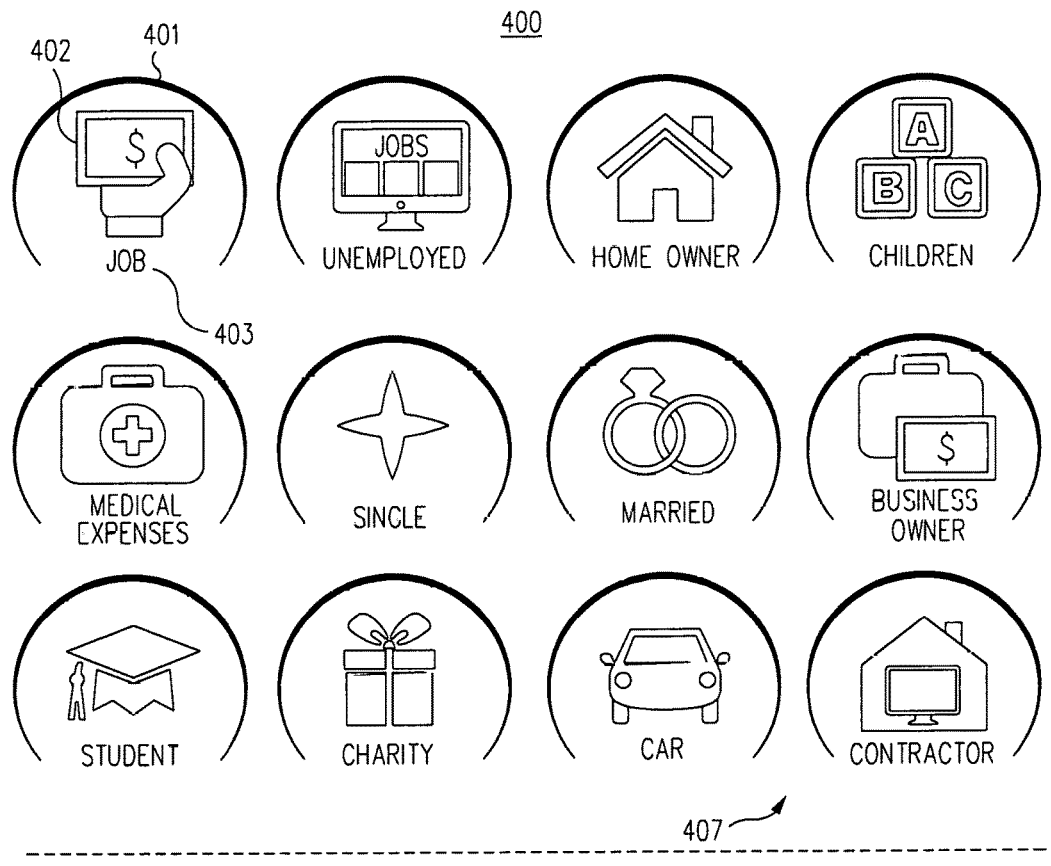
FIG. 4 is a diagram of a user interface for graphically determining tax-related topics that may be relevant to the user, in accordance with one embodiment.
Figure 4:
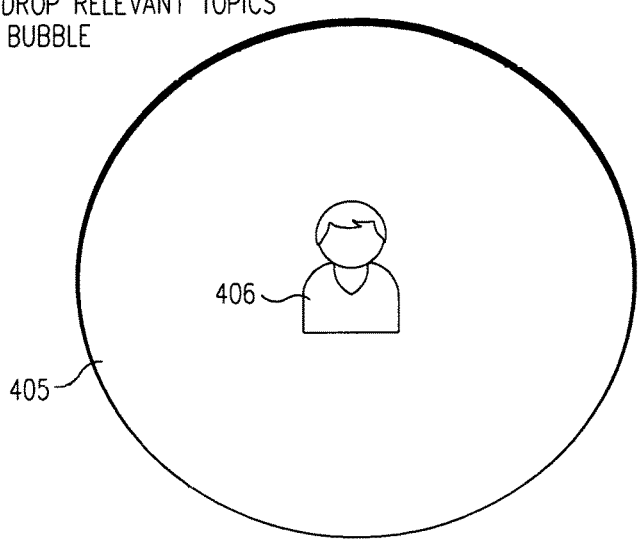

FIG. 4 illustrates a user interface 400 for enabling a user to graphically determine tax-related topics that may be relevant to the user, based on a graphical selection of situations, social characteristics, and/or financial characteristics of the user, according to one embodiment. The user interface 400 includes a number of bubbles 401, which are example embodiments of the user experience elements 113 of the production environment 100, according to one embodiment. Each of the number of bubbles 401 includes an icon 402 and/or a text description 403, according to one embodiment. The user interface 400 includes instructions 404 for using the user interface 400, according to one embodiment. The user interface 400 also includes a bubble 405 associated with an icon 406 of the user, according to one embodiment. The bubble 405 enables the user to drag-and-drop one or more of the number of bubbles 401 into the bubble 405 to select, mark, and/or otherwise indicate which of the number of bubbles 401 are relevant to the user, according to one embodiment. The number of bubbles 401 can be configured to be statically, i.e., not moving, waiting for the user to drag and drop them into the bubble 405, according to one embodiment. In an alternative embodiment, the number of bubbles 401 can be configured to be bouncing off of one another and be moving slowly, rapidly, and/or pseudo-randomly within a first region 407 of the user interface 400, according to various embodiments.

Figure 5:
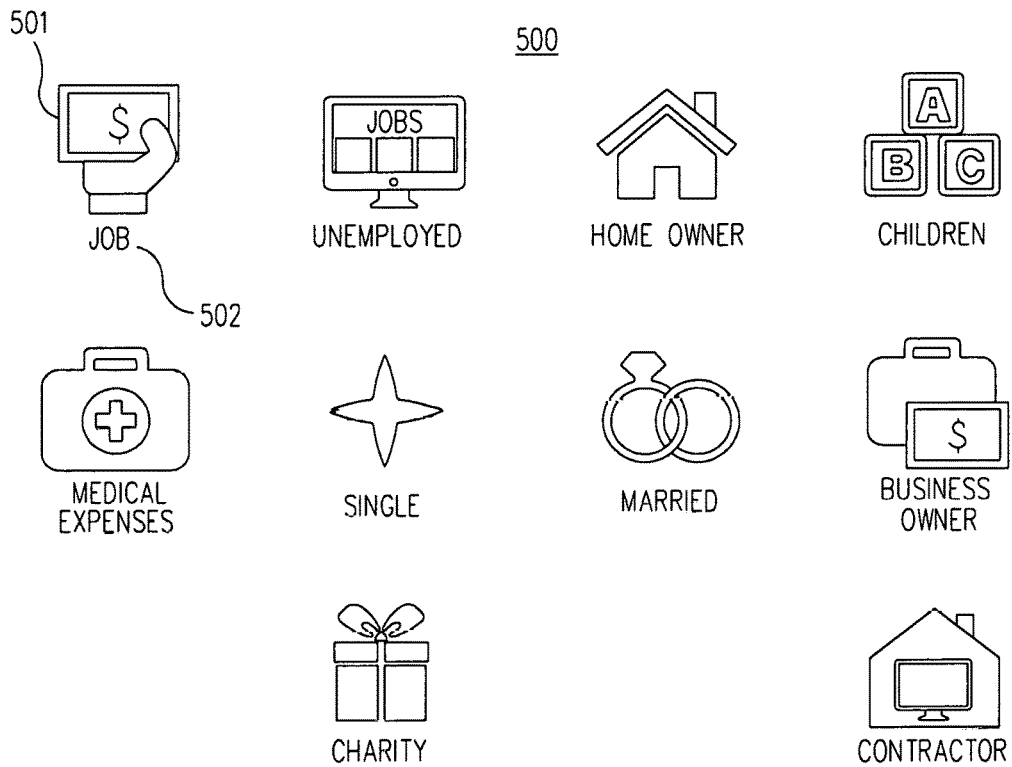
FIG. 5 is a diagram of a user interface for graphically determining tax-related topics that may be relevant to the user, in accordance with one embodiment.
Figure 5:
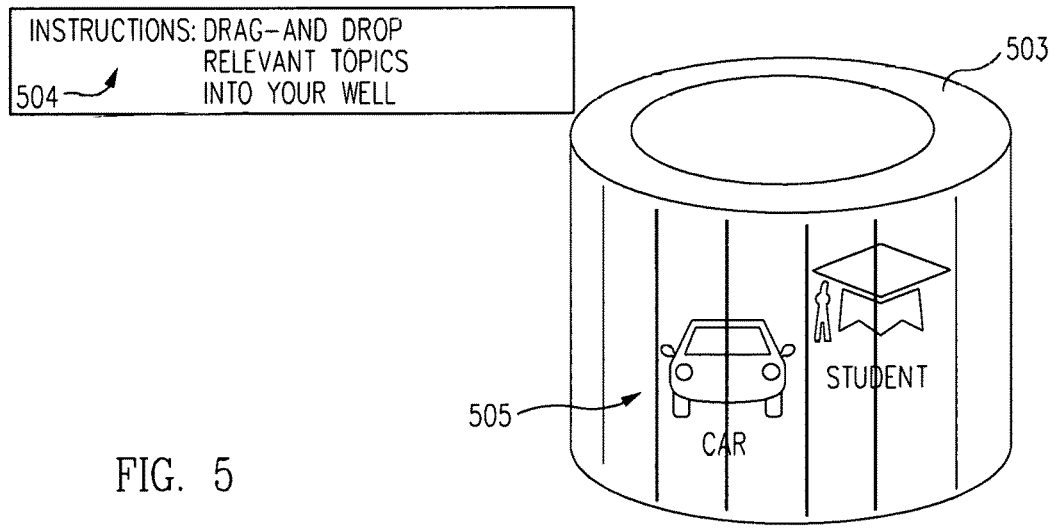

FIG. 5 illustrates a user interface 500 for enabling the user to graphically determine tax-related topics that may be relevant to the user, based on a graphical selection of situations, social characteristics, and/or financial characteristics of the user, according to one embodiment. The user interface 500 includes a number of icons 501, which are example embodiments of the user experience elements 113 of the production environment 100, according to one embodiment. The number of icons 501 are associated with corresponding text descriptions 502, according to one embodiment. As described above, each of the user experience elements 113, icons 501, bubbles 401, and/or tiles 301, are associated with a tax-related topic, a tax-related subtopic, and a number of tax return preparation interview questions, according to one embodiment. The user interface 500 includes a well 503 to receive relevant icons 501 from the user, according to one embodiment. While a well 503 is illustrated, any number of receptacles or other icons can be displayed in the user interface 500 to receive dragged-and-dropped icons 501 from the user, according to various embodiments. The user interface 500 optionally includes instructions 504 for using the user interface 500, according to one embodiment. The user interface 500 depicts one or more selected icons 505 that have been dragged-and-dropped into the well 503 by a user, according to one embodiment.

Figure 6:
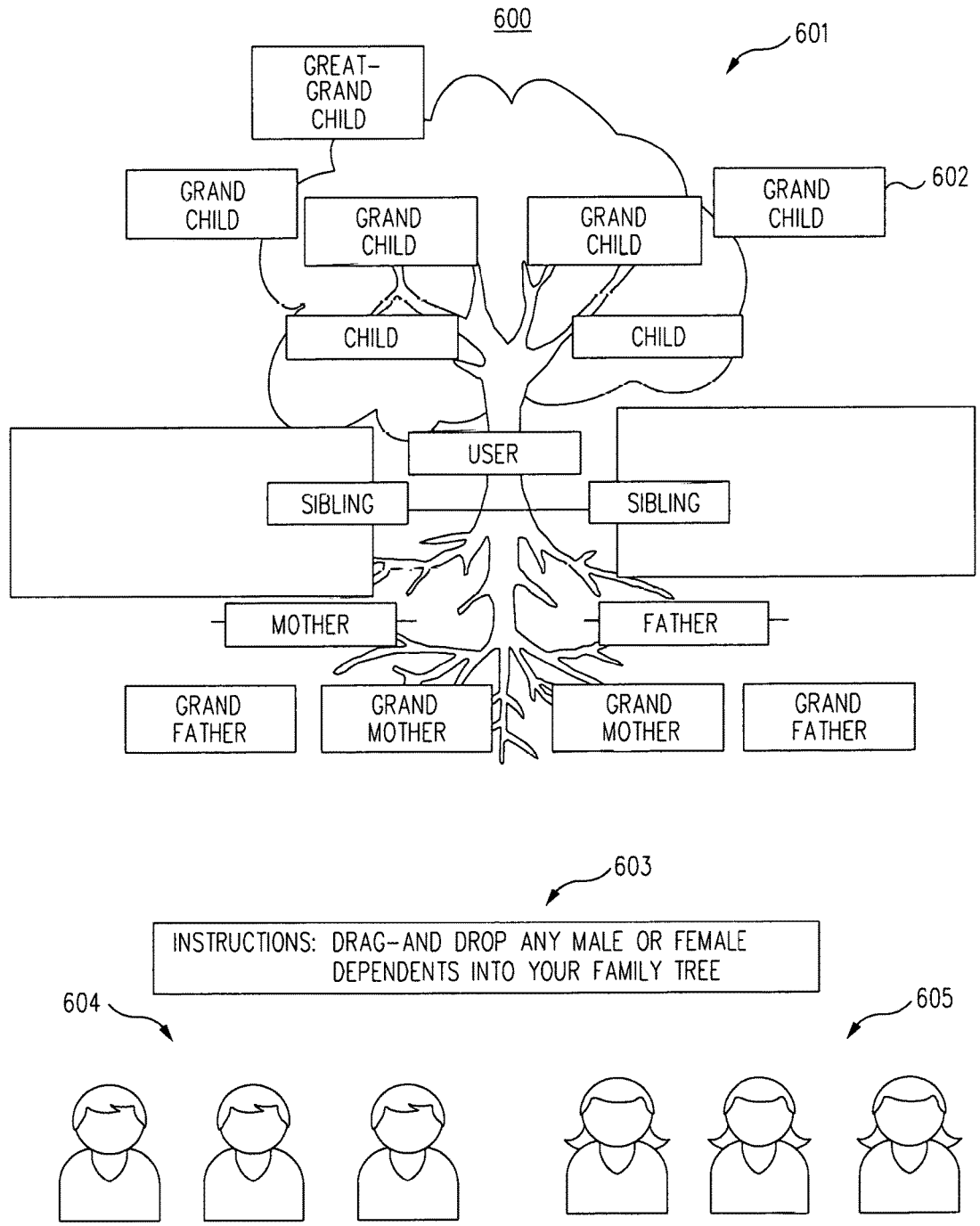
FIG. 6 is a diagram of a user interface for graphically providing relationships of dependents to a tax return preparation system, in accordance with one embodiment.

FIG. 6 illustrates a user interface 600 for enabling the user to graphically provide dependent-related information to the tax return preparation system using additional user experience elements, according to one embodiment. The user interface hundred includes a family tree 601 and family relationships 602 that are within the family tree 601, according to one embodiment. The user interface 600 includes instructions 603 for using the user interface 600, according to one embodiment. The user interface 600 includes male icons 604 and female icons 605 to enable the user to select a sex of a dependent and drag-and-drop an icon that is representative of the dependent into a family relationship 602 in the family tree 601, according to one embodiment. The male icons 604, female icons 605 and the family tree 601 are examples of the user experience elements 113, according to one embodiment.

As noted above, the specific illustrative examples discussed above are but illustrative examples of implementations of embodiments of the method or process for determining and reducing the likelihood of abandonment of a task by a user within a tax return preparation system, which uses interchangeable analytics modules of the production environment 100. Those of skill in the art will readily recognize that other implementations and embodiments are possible. Therefore the discussion above should not be construed as a limitation on the claims provided below.

In accordance with an embodiment, computing system implemented method reduces a presentation of less-relevant questions to a user of a tax return preparation system to personalize a tax return preparation interview process for the user. The method includes providing, with a user interface hosted by a computing system, a number user experience elements to a user to select from, according to one embodiment. Each of the number of user experience elements includes a graphical representation of at least one of: a tax-related topic, a social characteristic of the user, and a financial characteristic of the user, according to one embodiment. The number of user experience elements are selectable by the user through the user interface by moving one or more of the number of user experience elements from a first region in the user interface to a second region of the user interface, according to one embodiment. The method includes receiving selected ones of the number of user experience elements from the user interface, according to one embodiment. The method includes prioritizing questions of the tax return preparation interview process, by relevance to the user, based at least partially on the selected ones of the number of user experience elements, according to one embodiment. The method includes delivering relevant ones of the questions to the user through the user interface to progress the user through the tax return preparation interview process, according to one embodiment.

In accordance with one embodiment, a computer-readable medium includes a plurality of computer-executable instructions which, when executed by a processor, perform a method for reducing a presentation of less-relevant questions to a user of a tax return preparation system to personalize a tax return preparation interview process for the user. The instructions include a tax return preparation engine that hosts a user interface to provide user experience elements and relevant interview questions to the user to progress the user through the tax return preparation interview process, according to one embodiment. The user experience elements include graphical icons that are associated with tax-related topics, and the user experience elements are selectable by the user through the user interface by moving one or more of the user experience elements from a first region in the user interface to a second region of the user interface, according to one embodiment. The instructions include a data structure that includes questions for the tax return preparation interview process, according to one embodiment. Each question is associated with at least one of the tax-related topics, according to one embodiment. The instructions include a question relevance module that receives selected ones of the user experience elements, and the question relevance module is configured to determine the relevant interview questions from the questions for the tax return preparation interview process, at least partially based on the selected ones of the user experience elements, according to one embodiment.

In accordance with one embodiment, a system reduces a presentation of less-relevant questions to a user of a tax return preparation system to personalize a tax return preparation interview process for the user. The system includes at least one processor; and at least one memory coupled to the at least one processor, the at least one memory having stored therein instructions which, when executed by any set of the one or more processors, perform a process for reducing a presentation of less-relevant questions to a user of a tax return preparation system to personalize a tax return preparation interview process for the user, according to one embodiment. The process includes providing, with a user interface hosted by a computing system, a number user experience elements to a user to select from, according to one embodiment. Each of the number of user experience elements includes a graphical representation of at least one of: a tax-related topic, a social characteristic of the user, and a financial characteristic of the user, according to one embodiment. The number of user experience elements are selectable by the user through the user interface by moving one or more of the number of user experience elements from a first region in the user interface to a second region of the user interface, according to one embodiment. The process includes receiving selected ones of the number of user experience elements from the user interface, according to one embodiment. The process includes prioritizing questions of the tax return preparation interview process, by relevance to the user, based at least partially on the selected ones of the number of user experience elements, according to one embodiment. The process includes delivering relevant ones of the questions to the user through the user interface to progress the user through the tax return preparation interview process, according to one embodiment.

By minimizing, or potentially eliminating, the processing and presentation of irrelevant questions to a user, implementation of embodiments of the present disclosure allows for significant improvement to the technical fields of user experience, electronic tax return preparation, data collection, and data processing. As one illustrative example, by minimizing, or potentially eliminating, the processing and presentation of irrelevant question data to a user, implementation of embodiments of the present disclosure uses fewer human resources (e.g., time, focus) by not asking irrelevant questions and allows for relevant data collection by using fewer processing cycles and less communications bandwidth. As a result, embodiments of the present disclosure allow for improved processor performance, more efficient use of memory access and data storage capabilities, reduced communication channel bandwidth utilization, faster communications connections, and improved user efficiency. Consequently, computing and communication systems are transformed into faster and more operationally efficient devices and systems by implementing and/or providing the embodiments of the present disclosure. Therefore, implementation of embodiments of the present disclosure amount to significantly more than an abstract idea and also provide several improvements to multiple technical fields.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for reducing a presentation of less-relevant questions to a user of a tax return preparation system to personalize a tax return preparation interview process for the user, comprising:
   providing, with a user interface hosted by a mobile computing system of a user, a number of user experience elements comprising draggable graphical tiles,
   wherein each of the number of user experience elements includes a graphical tiled representation of at least one of:
      a tax-related topic,
      a social characteristic of the user, and
      a financial characteristic of the user,
   wherein the individual ones of the number of user experience elements are selectable by the user through the user interface by the user moving individual ones of the number of user experience elements from a first region of the user interface to a second region of the user interface;
   receiving selected ones of the number of user experience elements from the user interface;
   determining a relevancy of each question of a question pool stored in a data structure configured with questions, attributes of each question, and associated tax topics associated with a subject matter of each question, the determined relevancy being at least partly based on the selected ones of the user experience elements;
   linking individual ones of the selected user experience elements as navigation elements to particular questions determined to be a high relevancy;
   prioritizing questions of the tax return preparation interview process, the determined relevancy, omitting questions of the tax preparation interview process having low relevancy to the user based on the determined relevancy;
   receiving a selection of one of the selected user experience elements, resulting in a navigation selection; and
   delivering relevant ones of the questions to the user through the user interface to progress the user through the tax return preparation interview process, an order of the questions being delivered being at least partly based on the navigation selection.

2. The method of claim 1, wherein the graphical representation of at least some of the number of user experience elements is selected from a group of icons consisting of:
   a car;
   a currency;
   a computer monitor;
   a house;
   children's blocks;
   a medical bag;
   a star;
   wedding rings;
   a briefcase;
   a graduation cap;
   a present; and
   a car.

3. The method of claim 1, wherein each of the graphical representations of the number of user experience elements is associated with one or more of the questions of the tax return preparation interview process.

4. The method of claim 1, wherein the graphical representations of the number of user experience elements includes at least one of a tile and a bubble.

5. The method of claim 1, wherein the second region of the user interface includes at least one of an image of a pallet, a bubble, and a well.

6. The method of claim 1, wherein the social characteristic of the user includes at least one of:
   whether the user has children;
   whether the user is married; and
   whether the user has dependents other than children.

7. The method of claim 1, wherein the financial characteristic of the user includes at least one of:
   whether the user is employed;
   whether the user contributes to charity;
   whether the user is a home owner;

whether the user has medical expenses;
whether the user is a student; and
whether the user owns a car.

8. The method of claim 1, wherein prioritizing the questions of the tax return preparation interview process includes filtering irrelevant questions from the questions of the tax return preparation interview process if the irrelevant questions are not associated with at least one of the selected ones of the number of user experience elements.

9. The method of claim 1, wherein prioritizing the questions of the tax return preparation interview process includes filtering relevant questions from the questions of the tax return preparation interview process if the relevant questions are associated with at least one of the selected ones of the number of user experience elements.

10. The method of claim 9, further comprising:
providing additional user experience elements to the user interface for the user to select from, based at least partially on the selected ones of the number of user experience elements.

11. The method of claim 1, further comprising:
indicating which ones of the questions of the tax return preparation interview have been completed by the user by highlighting ones of the number of user experience elements that correspond with the completed questions of the tax return preparation interview.

12. The method of claim 1, wherein delivering relevant ones of the questions to the user includes omitting ones of the questions that do not correspond with at least one of the selected ones of the number of user experience elements.

13. The method of claim 1, wherein delivering relevant ones of the questions to the user includes delivering more relevant ones of the questions before delivering less relevant ones of the questions.

14. The method of claim 1, wherein each of the questions of the tax return preparation includes attributes, wherein the attributes include one or more of a question identification, question content, a topic, a subtopic, and a priority.

15. The method of claim 14, wherein prioritizing the questions of the tax return preparation interview process includes prioritizing the questions at least partially based on the attributes.

16. A nontransitory computer-readable medium having a plurality of computer-executable instructions which, when executed by a processor, perform a method for reducing a presentation of less-relevant questions to a user of a tax return preparation system to personalize a tax return preparation interview process for the user, the instructions comprising:
a tax return preparation engine configured to host a user interface to provide user experience elements and relevant interview questions to the user to progress the user through the tax return preparation interview process hosted by a mobile computing system of a user;
wherein the user experience elements include graphical tiled icons that are associated with tax-related topics,
wherein the user experience elements are selectable by the user through the user interface by moving one or more of the user experience elements from a first region in the user interface to a second region of the user interface;
a data structure that includes questions for the tax return preparation interview process,
wherein each question is associated with at least one of the tax-related topics, the data structure configured with questions, attributes of each question, and associated tax topics associated with a subject matter of each question; and
a question relevance module configured to receive selected ones of the user experience elements,
wherein the question relevance module is configured to determine the relevant interview questions from the questions for the tax return preparation interview process, at least partially based on the selected ones of the user experience elements, and is further configured to link individual ones of selected user experience elements as navigation elements to particular questions determined to be a high relevancy and receive a selection one of the user experience elements and responsively delivering at least one question to the user based on the selected one of the user experience elements and the navigation element.

17. The computer-readable medium of claim 16, wherein the user experience elements include at least one of a tile icon and a bubble icon that is selectable by the user.

18. The computer-readable medium of claim 16, wherein the question relevance module determines relevant interview questions based on the tax-related topics of the questions and based on the selected ones of the user experience elements.

19. A system for reducing a presentation of less-relevant questions to a user of a tax return preparation system to personalize a tax return preparation interview process for the user, the system comprising:
at least one processor; and
at least one memory coupled to the at least one processor, the at least one memory having stored therein instructions which, when executed by the at least one processors, perform a process for reducing a presentation of less-relevant questions to a user of a tax return preparation system to personalize a tax return preparation interview process for the user, the process including:
providing, with a user interface hosted by a mobile computing system of a user, a number of user experience elements comprising draggable graphical tiles,
wherein each of the number of user experience elements includes a graphical tiled representation of at least one of:
a tax-related topic,
a social characteristic of the user, and
a financial characteristic of the user,
wherein the individual ones of the number of user experience elements are selectable by the user through the user interface by the user moving individual ones of the number of user experience elements from a first region of the user interface to a second region of the user interface;
receiving selected ones of the number of user experience elements from the user interface;
determining a relevancy of each question of a question pool stored in a data structure configured with questions, attributes of each question, and associated tax topics associated with a subject matter of each question, the determined relevancy being at least partly based on the selected ones of the user experience elements;
linking individual ones of the selected user experience elements as navigation elements to particular questions determined to be a high relevancy;
prioritizing questions of the tax return preparation interview process, the determined relevancy, omitting questions of the tax preparation interview process having low relevancy to the user based on the determined relevancy;

receiving a selection of one of the selected user experience elements, resulting in a navigation selection; and delivering relevant ones of the questions to the user through the user interface to progress the user through the tax return preparation interview process, an order of the questions being delivered being at least partly based on the navigation selection.

20. The system of claim 19, wherein the graphical representation of at least part of the number of user experience elements is selected from a group of icons consisting of:
a car;
a currency;
a computer monitor;
a house;
children's blocks;
a medical bag;
a star;
wedding rings;
a briefcase;
a graduation cap;
a present; and
a car.

21. The system of claim 19, wherein each of the graphical representations of the number of user experience elements is associated with one or more of the questions of the tax return preparation interview process.

22. The system of claim 19, wherein the graphical representations of the number of user experience elements includes at least one of a tile and a bubble.

23. The system of claim 19, wherein the second region of the user interface includes at least one of an image of a pallet, a bubble, and a well.

24. The system of claim 19, wherein the social characteristic of the user includes at least one of:
whether the user has children;
whether the user is married; and
whether the user has dependents other than children.

25. The system of claim 19, wherein the financial characteristic of the user includes at least one of:
whether the user is employed;
whether the user contributes to charity;
whether the user is a home owner;
whether the user has medical expenses;
whether the user is a student; and
whether the user owns a car.

26. The system of claim 19, wherein prioritizing the questions of the tax return preparation interview process includes filtering irrelevant questions from the questions of the tax return preparation interview process if the irrelevant questions are not associated with at least one of the selected ones of the number of user experience elements.

27. The system of claim 19, wherein prioritizing the questions of the tax return preparation interview process includes filtering relevant questions from the questions of the tax return preparation interview process if the relevant questions are associated with at least one of the selected ones of the number of user experience elements.

28. The system of claim 27, wherein the process further comprises:
providing additional user experience elements to the user interface for the user to select from, based at least partially on the selected ones of the number of user experience elements.

29. The system of claim 19, wherein the process further comprises:
indicating which ones of the questions of the tax return preparation interview have been completed by the user by highlighting ones of the number of user experience elements that correspond with the completed questions of the tax return preparation interview.

30. The system of claim 19, wherein delivering relevant ones of the questions to the user includes omitting ones of the questions that do not correspond with at least one of the selected ones of the number of user experience elements.

31. The system of claim 19, wherein delivering relevant ones of the questions to the user includes delivering more relevant ones of the questions before delivering less relevant ones of the questions.

32. The system of claim 19, wherein each of the questions of the tax return preparation includes attributes, wherein the attributes include one or more of a question identification, question content, a topic, a subtopic, and a priority.

33. The system of claim 32, wherein prioritizing the questions of the tax return preparation interview process includes prioritizing the questions at least partially based on the attributes.

\* \* \* \* \*